US012716279B2

(12) United States Patent
Bijl et al.

(10) Patent No.: US 12,716,279 B2
(45) Date of Patent: Aug. 25, 2026

(54) MOUNTABLE DOORSTOP

(71) Applicant: Bijl Welding Ltd., Dawson Creek (CA)

(72) Inventors: Darrell Bijl, Dawson Creek (CA); Stephanie Bijl, Dawson Creek (CA)

(*) Notice: Subject to any disclaimer, the term of this patent is extended or adjusted under 35 U.S.C. 154(b) by 2 days.

(21) Appl. No.: 18/424,542

(22) Filed: Jan. 26, 2024

(65) Prior Publication Data

US 2024/0254817 A1 Aug. 1, 2024

Related U.S. Application Data

(60) Provisional application No. 63/441,530, filed on Jan. 27, 2023.

(51) Int. Cl.
*E05C 17/54* (2006.01)
*E05F 5/06* (2006.01)

(52) U.S. Cl.
CPC ................ *E05C 17/54* (2013.01); *E05F 5/06* (2013.01)

(58) Field of Classification Search
CPC ..... Y10T 292/71; Y10T 292/73; E05C 17/54; E05C 17/02; E05F 5/06; E04G 2005/148; E04G 5/14; E04F 2011/1868; E04F 11/1863; A61H 2003/001; A47J 45/10; B60R 3/005; B25G 3/06
USPC ..... 292/343, 342; 16/82, 422, 425, 426, 413
See application file for complete search history.

(56) References Cited

U.S. PATENT DOCUMENTS 377,927 A * 2/1888 Campbell ............... E05C 17/54 292/343
1,769,668 A * 7/1930 Winkie ................. A47J 45/078 220/759
1,918,652 A * 7/1933 Marbach ............... E05C 17/203 16/82
1,922,298 A * 8/1933 Jones ...................... E05C 17/54 292/342
1,932,099 A * 10/1933 Cabana ................. A47L 13/252 403/349
2,370,860 A * 3/1945 Hanke ................... A47J 45/071 220/759
2,425,937 A * 8/1947 Hilton ..................... E05C 17/54 292/342
2,782,796 A * 2/1957 Blue ........................ A61H 3/02 135/65
3,289,685 A * 12/1966 Mccall Parker ..... A61H 3/0288 135/65
4,274,430 A * 6/1981 Schaaf ..................... A61H 3/00 135/65

(Continued)

FOREIGN PATENT DOCUMENTS

WO WO-9314293 A1 * 7/1993 ............... B25H 1/06

*Primary Examiner* — Emily M Morgan
(74) *Attorney, Agent, or Firm* — McMillan LLP

(57) ABSTRACT

A doorstop mountable to a bar grating, the doorstop comprising: a body having a first end and an opposing second end; a handle attached to the first end of the body; and a mounting member comprising: a base having a first side attached to the second end of the body and a second side opposing the first side; a first receiving member extending from the second side of the base, wherein the first receiving member defines a first slot for receiving a bar of the bar grating; and a second receiving member extending from the second side of the base and opposing the first receiving member, wherein the second receiving member defines a second slot opposing the first slot for receiving the bar of the bar grating.

6 Claims, 10 Drawing Sheets

(56) References Cited

U.S. PATENT DOCUMENTS

| | | | | | |
|---|---|---|---|---|---|
| 5,217,269 | A * | 6/1993 | Wiltberger | E05C 17/54 | |
| | | | | 292/343 | |
| 5,263,551 | A * | 11/1993 | Andersen | E04D 15/00 | |
| | | | | 182/129 | |
| 5,941,262 | A * | 8/1999 | Tschirhart | A61H 3/00 | |
| | | | | 135/65 | |
| 7,261,344 | B1 * | 8/2007 | Drake, Jr. | E05B 1/0053 | |
| | | | | 292/342 | |
| 8,925,155 | B2 * | 1/2015 | Grudzien | E04F 11/1863 | |
| | | | | 16/110.1 | |
| 10,479,416 | B1 * | 11/2019 | Martin | B60R 3/02 | |
| 2004/0256866 | A1 * | 12/2004 | Deming, Jr. | E05C 17/54 | |
| | | | | 292/343 | |
| 2007/0034583 | A1 * | 2/2007 | Henning | E04C 2/322 | |
| | | | | 211/153 | |
| 2013/0111707 | A1 * | 5/2013 | Mowry | A47J 45/10 | |
| | | | | 16/422 | |
| 2021/0172224 | A1 * | 6/2021 | Ruby | E05C 19/188 | |
| 2022/0154501 | A1 * | 5/2022 | Johnson | E05F 5/06 | |

* cited by examiner

MOUNTABLE DOORSTOP

CROSS-REFERENCE TO RELATED APPLICATIONS

This application claims priority from application No. 63/441,530, filed 27 Jan. 2023. For purposes of the United States, this application claims the benefit under 35 U.S.C. § 119 of application No. 63/441,530, filed 27 Jan. 2023, and entitled Mountable Doorstop which is hereby incorporated herein by reference for all purposes.

TECHNICAL FIELD

The present disclosure is directed to doorstops. More particularly, the present disclosure is directed to doorstops mountable to bar grating.

BACKGROUND

Bar grating, also know as steel grating, aluminum grating, and steel bar grating, is commonly used as industrial flooring. Bar grating comprises parallel bearing bars connected by crossbars running across the bearing bars. The bearing bars and crossbars collectively form the bars of the bar grating. Bar grating has gaps between the bars typically much larger than the thickness of the bars. As such, the open gaps between bars comprises much of the flooring surface of bar grating. Furthermore, the surface formed by the bearing bars and/or crossbars may have multiple ridges and/or grooves in order to increase traction of the flooring surface.

Industrial buildings commonly use bar grating as indoor and/or outdoor flooring. For various reasons, the doors of such building may need to be stopped from swinging open or closed beyond a point. For example, a door may need to be held open and stopped from swinging closed so that people and items may move freely in and/or out of the building. As a further example, a door may need to be held open and stopped from swinging closed for ventilation, for example, when individuals are working inside the building with machines and/or materials that produce noxious emissions. In another example, a door may be permitted to swing open and closed, but need to be stopped from swinging open past a point, for example beyond 90 degrees from closed, to avoid swinging into an object or surface in the swinging path of the door.

Conventional doorstops, for example wedges, may require a smooth and/or solid surface to stop a door from swinging. Due to the gaps in bar grating and/or the rough surface of bar grating, such doorstops may not operate well on bar grating. Furthermore, the commercial nature of many of the industries within which bar grating is used, for example the oil and gas industry, require doorstops that can be easily and securely mounted to and dismounted from bar grating to avoid disrupting the commercial operations.

There is a general desire for a doorstop mountable to bar grating that can hold open a door. There is a further desire for a doorstop that can hold open a door and can be easily mounted to and dismounted from bar grating.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides: a doorstop mountable to bar grating, the doorstop comprising: a body having a first end and an opposing second end; a handle attached to the first end of the body; and a mounting member comprising: a base having a first side attached to the second end of the body and a second side opposing the first side; and a receiving member extending from the second side of the base, wherein the receiving member defines a slot for receiving a bar of the bar grating.

Another aspect of the invention provides: a doorstop mountable to a bar grating, the doorstop comprising: a body having a first end and an opposing second end; a handle attached to the first end of the body; and a mounting member comprising: a base having a first side attached to the second end of the body and a second side opposing the first side; a first receiving member extending from the second side of the base, wherein the first receiving member defines a first slot for receiving a bar of the bar grating; and a second receiving member extending from the second side of the base and opposing the first receiving member, wherein the second receiving member defines a second slot opposing the first slot for receiving the bar of the bar grating.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1A:
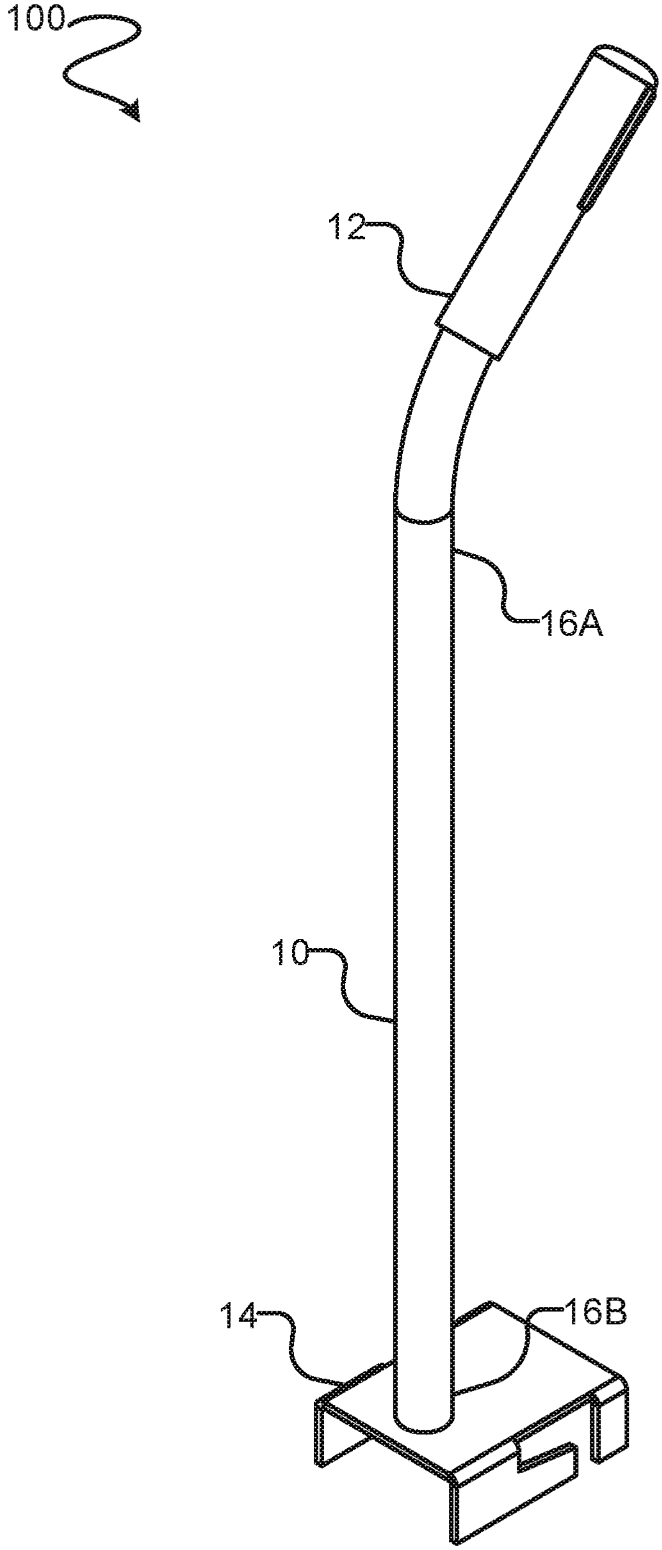
FIG. 1A is a perspective view of a doorstop mountable to a bar grating according to an example embodiment of the present invention.

FIG. 1A is a perspective view of doorstop 100 mountable to a bar grating. Doorstop 100 comprises body 10, handle 12, and mounting member 14. Body 10 has first end 16A and opposing second end 16B. Handle 12 is attached to first end 16A of body 10, and mounting member 14 is attached to second end 16B of body 10.

Mounting member 14 is mountable to a bar of a bar grating, thereby mounting doorstop 100 to the bar grating. When doorstop 100 is mounted to the bar grating, body 10 may block a door from swinging over doorstop 100. As such, doorstop 100 may be used to stop a door from swinging beyond a desired point along the bar grating by mounting doorstop 100 to the bar grating generally over the desired point. A door may be held in a desired position by placing the door in the desired position and mounting doorstop 100 to the bar grating in the path of the door. Doorstop 100 stops the door from swinging past where doorstop 100 is mounted to the bar grating, thereby keeping the door in the desired position.

Figure 1B:
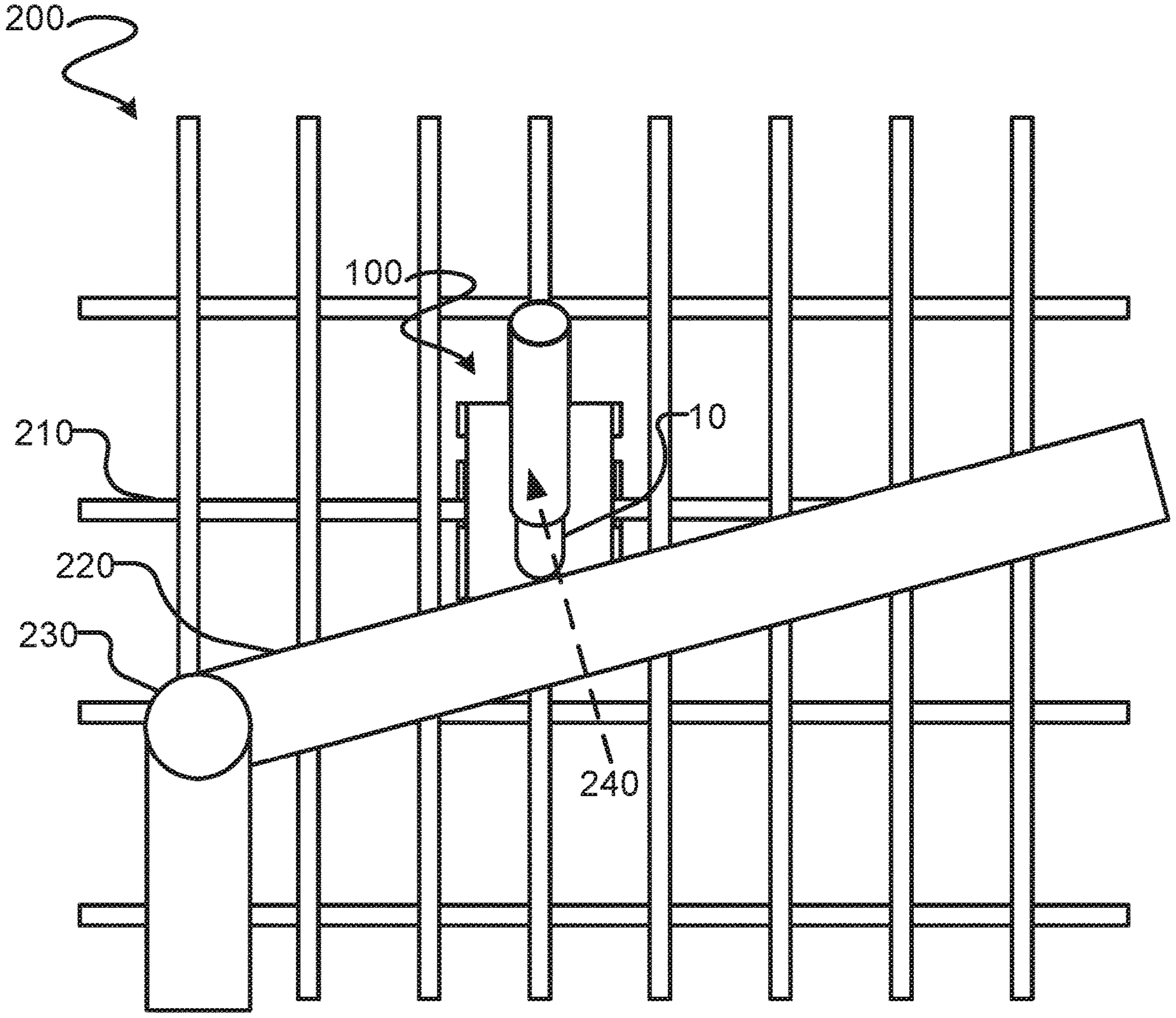
FIGS. 1B and 1C are top views of the doorstop depicted in FIG. 1A mounted to a bar grating.

FIG. 1B is a top view of doorstop 100 mounted to bar 210 of bar grating 200. Door 220 swings about pivot 230 along path 240. Doorstop 100 is mounted to bar grating 200 within path 240 of door 220, thereby stopping door 220 from swinging about pivot 230 past doorstop 100.

Figure 1C:
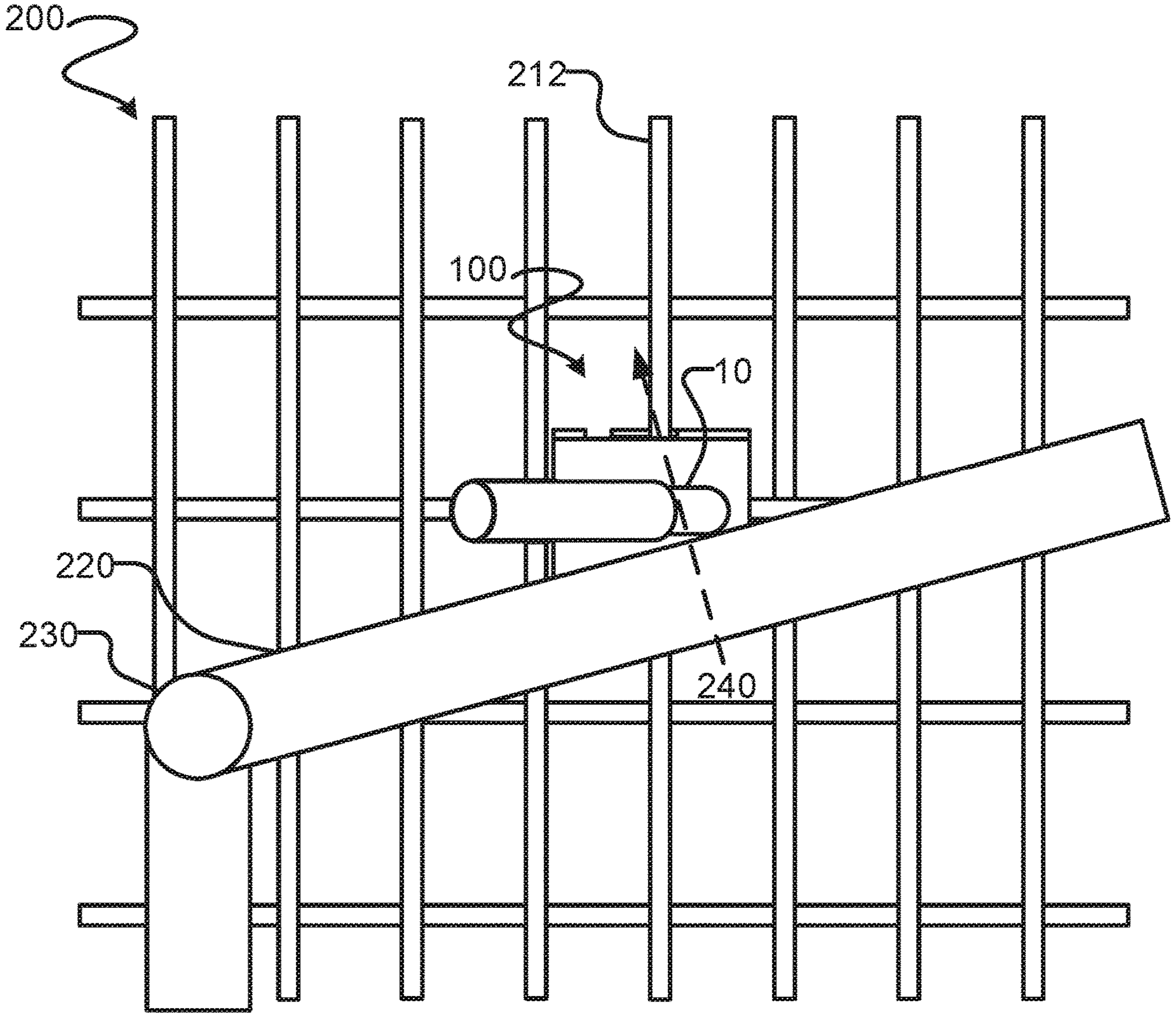

FIG. 1C is a top view of doorstop 100 mounted to bar 212 of bar grating 200, wherein bar 212 runs perpendicular to bar 210. Doorstop 100 is mounted to bar grating 200 within path 240 of door 220, thereby stopping door 220 from swinging about pivot 230 past doorstop 100.

Figure 2A:
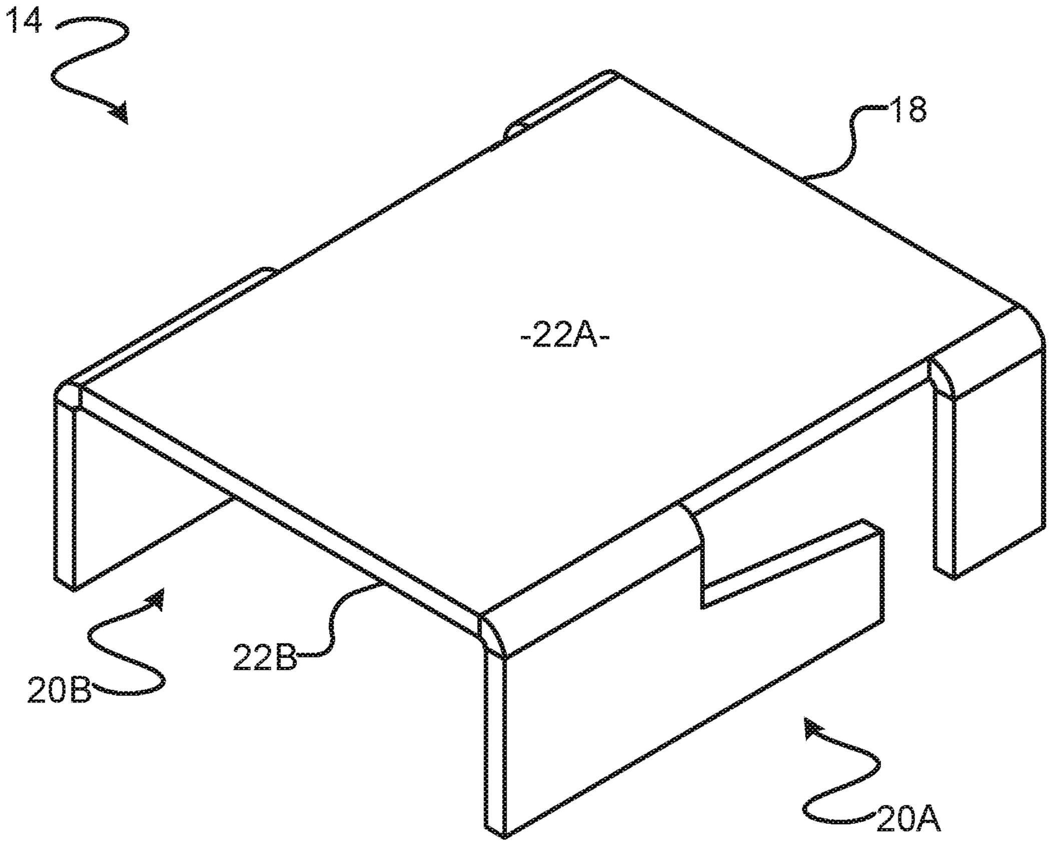
FIG. 2A is a perspective view of a doorstop mounting member according to an example embodiment of the present invention.
Figure 2B:
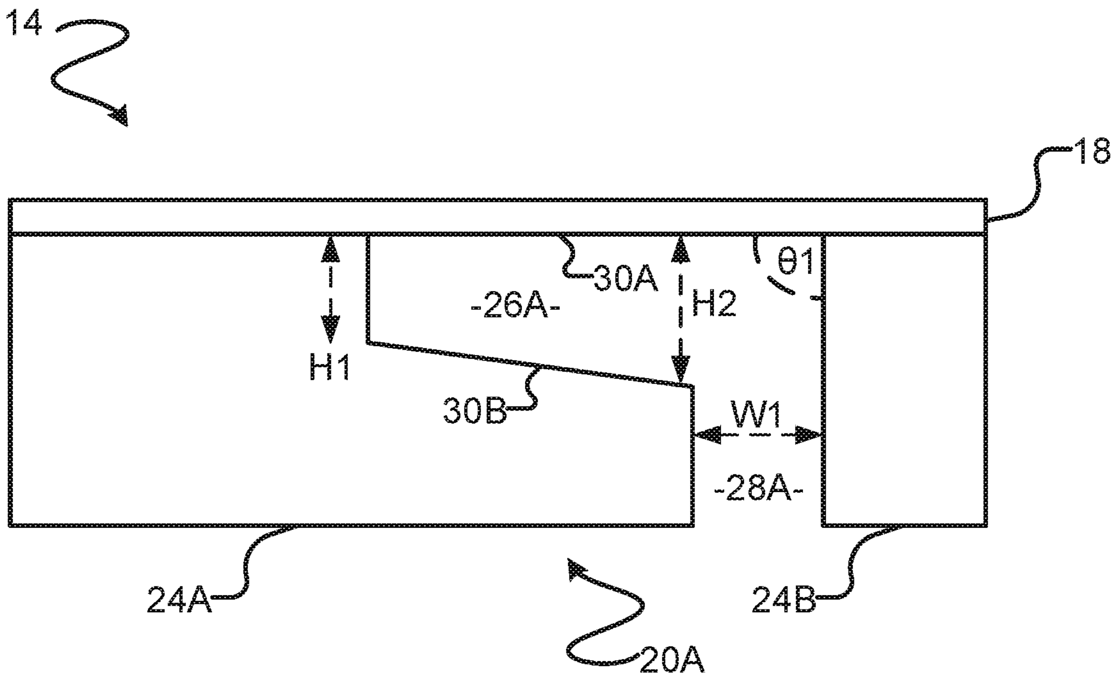
FIGS. 2B and 2C are side views of the mounting member depicted in FIG. 2A.
Figure 2C:
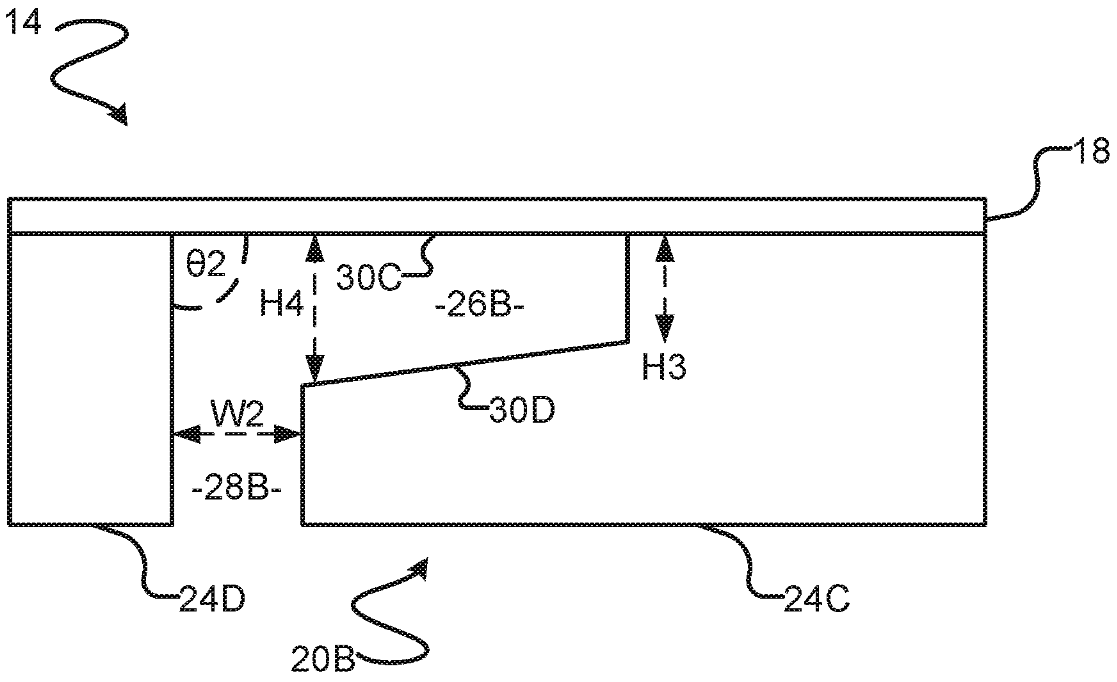

FIG. 2A is a perspective view of mounting member 14. Mounting member 14 comprises base 18, first receiving member 20A, and second receiving member 20B opposing first receiving member 20A. FIG. 2B is a first side view of mounting member 14 facing first receiving member 20A, and FIG. 2C is a second side view of mounting member 14 facing second receiving member 20B.

Base 18 has first side 22A and second side 22B opposing first side 22A. First side 22A of base 18 is attached to second end 16B of body 10.

First receiving member 20A and second receiving member 20B (collectively, receiving members 20) define opposing slots for receiving a bar of a bar grating, thereby mounting doorstop 100 to the bar.

In some embodiments, first receiving member 20A comprises first projection 24A and second projection 24B. First projection 24A and base 18 define first slot 26A, and first projection 24A and second projection 24B define first channel 28A. Second receiving member 20B comprises third projection 24C opposing first projection 24A, and fourth projection 24D opposing second projection 24B. Third projection 24C and base 18 define second slot 26B opposing first slot 26A, and third projection 24C and fourth projection 24D define second channel 28B opposing first channel 28A.

In some embodiments, first slot 26A and second slot 26B (collectively, slots 26) each have a closed end and an opposing open end. Slots 26 may each be tapered from the respective open end to the respective close end, forming tapered slots. In some embodiments, slots 26 have respective level sides 30A and 30C, and respective tapered sides 30B and 30D opposing level sides 30A and 30C. Level sides 30A and 30C of slots 26 may be defined by second side 22B of base 18. Tapered sides 30B and 30D may be respectively defined by first and third projections 24A and 24C.

The closed end of first slot 26A has first height H1 across first slot 26A, and the open end of first slot 26A has second height H2 across first slot 26A. The closed end of second slot 26B has third height H3 across second slot 26B, and the open end of second slot 26B has fourth height H4 across second slot 26B.

In some embodiments, first height H1 is substantially equal to third height H3, and second height H2 is substantially equal to fourth height H4. In such embodiments, receiving members 20 define substantially equal and opposing slots 26.

In some embodiments, second height H2 is greater than first height H1, and/or fourth height H4 is greater than third height H3, thereby forming one or more tapered slots. Where first height H1 is substantially equal to third height H3, second height H2 is substantially equal to fourth height H4, and second height H2 is greater than first height H1, receiving members 20 define substantially equal and opposing tapered slots 26.

In some embodiments, first receiving member 20A and second receiving member 20B respectively define first and second channels 28A and 28B (collectively, channels 28). First channel 28A adjoins first slot 26A at first angle θ1 to first slot 26A, and second channel 28B adjoins second slot 26B at second angle θ2 to second slot 26B, where first angle θ1 and second angle θ2 are substantially equal. In some embodiments, first angle θ1 and second angle θ2 are each substantially perpendicular.

First channel 28A has first width W1 across first channel 28A, and second channel 28B has second width W2 across second channel 28B. In some embodiments, first width W1 is substantially equal to second width W2. Where first angle θ1 and second angle θ2 are substantially equal, and first width W1 and second width W2 are substantially equal, receiving members 20 define substantially equal and opposing channels 28.

First width W1 and second width W2 (collectively widths W) are greater than a thickness of a bar of a bar grating, thereby permitting the bar to pass through channels 28 and into the open ends of slots 26. Where slots 26 form tapered slots, the bar may then pass from the open ends of tapered slots 26 towards the closed ends of tapered slots 26. As the bar is passes through tapered slots 26 towards the closed ends of tapered slots 26, the bar is progressively constrained by sides 30A, 30B, 30C and 30D of slots 26, thereby mounting member 14 to the bar. Where one or both of height H1 and height H2 are less than the thickness of the bar, the bar is wedged between opposing sides of slots 26 as the bar passes through tapered slots 26.

Figure 3A:
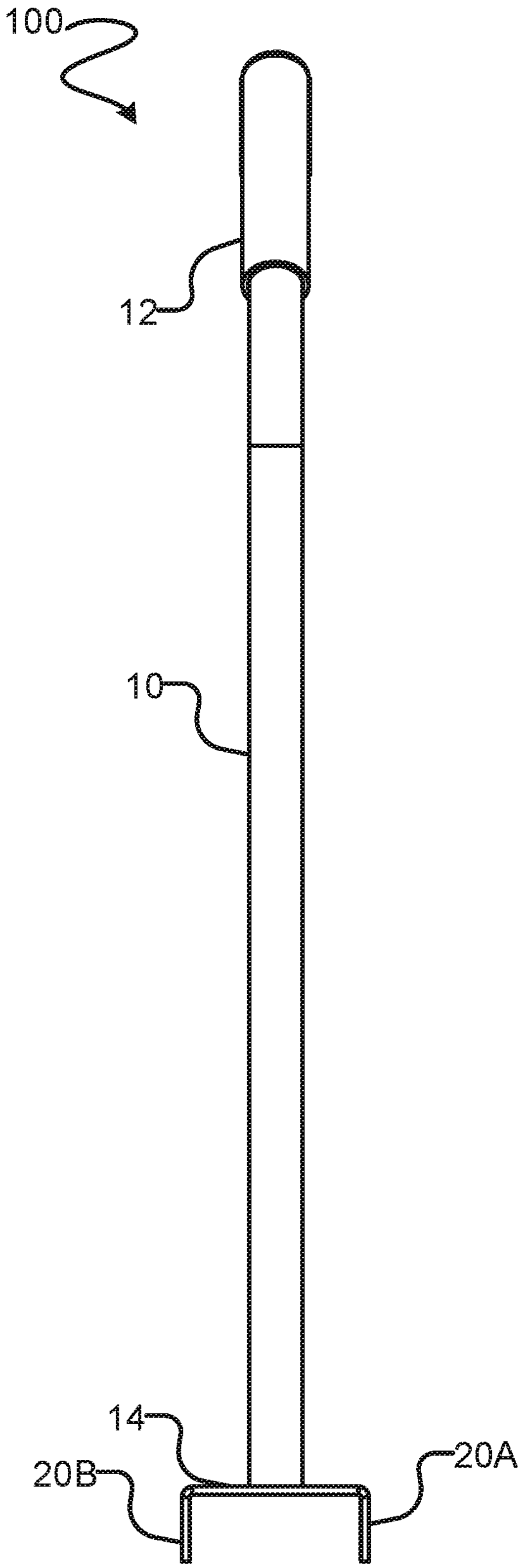
FIGS. 3A and 3B are respective front and side views of the doorstop depicted in FIG. 1A.
Figure 3B:
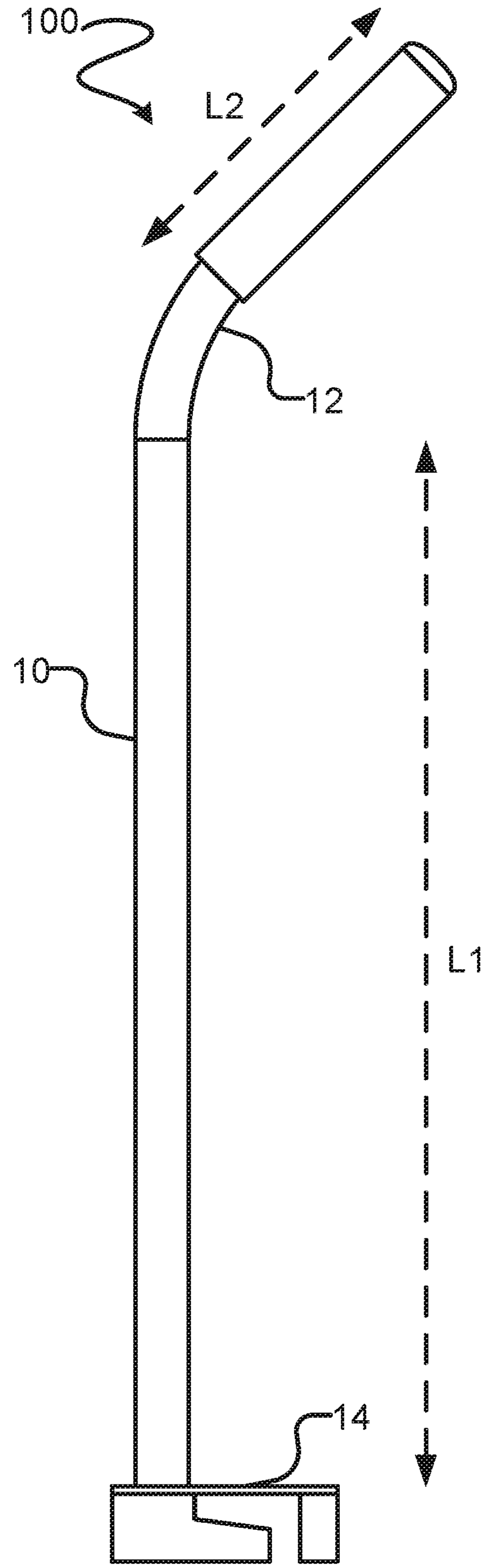

FIG. 3A is a front view of doorstop 100, and FIG. 3B is a side view of doorstop 100. In some embodiments, body 10 is attached to first side 22A of base 18 of mounting member 14 laterally spaced apart from where first side 22A of base 18 opposes second side 22B of base 18 that defines first side 30A of first slot 26A, and/or third side 30C of second slot 26B.

In some embodiments, handle 12 is attached to body 10 at an angle to body 10. Where handle 12 is attached to body 10 at an angle to body 10, handle 12 may be angled towards the first side 22A of base 18 that opposes second side 22B of base 18 that defines first side 30A of tapered slot 26, and/or third side 30C of second slot 26B.

Where handle 12 is angled to body 10, doorstop 100 may be mounted to a bar grating so that handle 12 is angled away from the side of body 10 that contacts a door, for example as depicted in FIG. 1B. Doorstop 100 may be so mounted so handle 12 does not interfere with door 220 contacting body 10. Furthermore, doorstop 100 may be so mounted so when door 220 contacts body 10, the force on body 10 from the contact of door 220 is transferred to—member 14, and the force on mounting member 14 directs the closed ends of slots 26 towards the bar on which doorstop 100 is mounted. As such, the force on mounting member 14 does not dismount doorstop 100 from the bar grating, but further secures doorstop 100 to the bar grating.

Doorstop 100 may also be mounted to a bar grating so that handle 12 is angled perpendicular to the side of body 10 that contacts a door, for example as depicted in FIG. 1C. Doorstop 100 may be so mounted so handle 12 does not interfere with door 220 contacting body 10. Furthermore, doorstop 100 may be so mounted so when door 220 contacts body 10, the force on body 10 from the contact of door 220 is transferred to mounting member 14, and the force on mounting member 14 directs slots 26 over the bar on which doorstop 100 is mounted. As such, the force on mounting member 14 does not dismount doorstop 100 from the bar grating.

In some embodiments, body 10 comprises one or both of a hollow tube and a solid rod. Handle 12 may comprise one or both of a hollow tube and a solid rod contiguous with the hollow tube or solid rod of body 10. Handle 12 may comprise a grooved rubber grip.

In some embodiments, body 10 has body length L1, and handle 12 has handle length L2. Body length L1 may be substantially three times handle length L2.

Figure 3D:
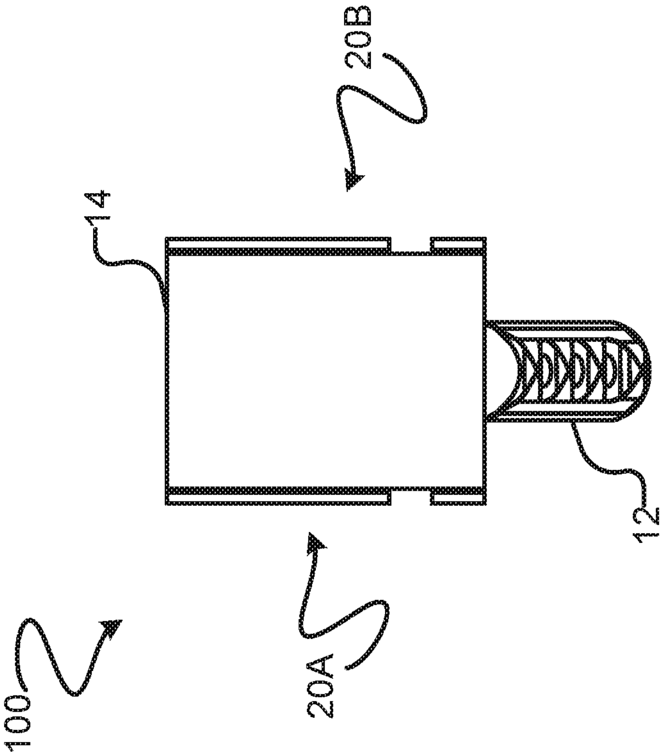
FIGS. 3C and 3D are respective top and bottom views of the doorstop depicted in FIG. 1A.
Figure 3C:
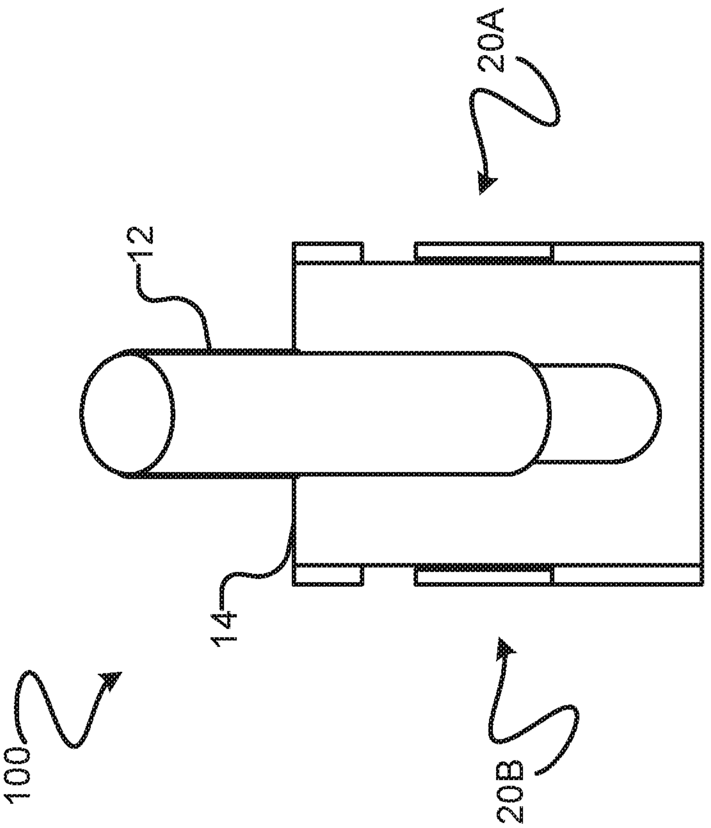

FIG. 3C is a top view of doorstop 100, and FIG. 3D is a bottom view of doorstop 100.

Figure 4A:
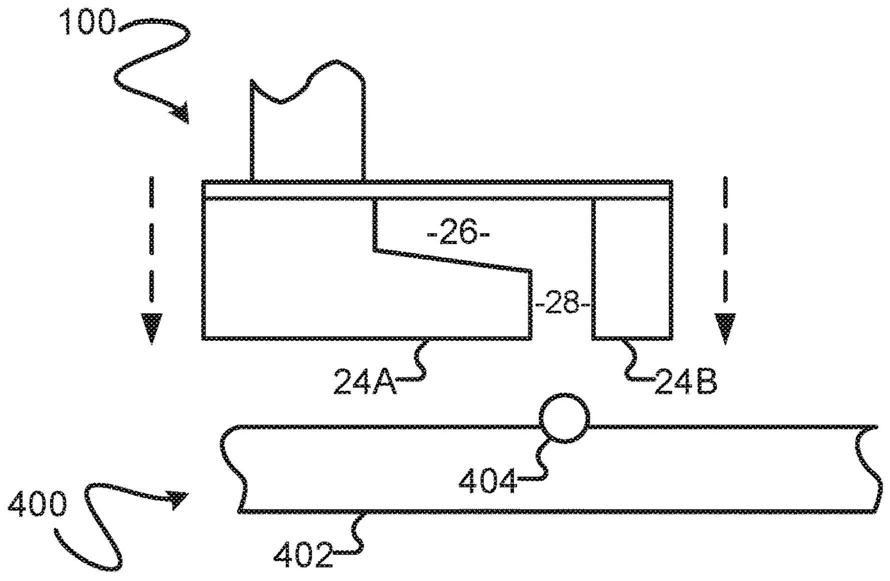
FIGS. 4A to 4C depicts a doorstop being mounted to a bar grating according to an example embodiment of the present invention.
Figure 4B:
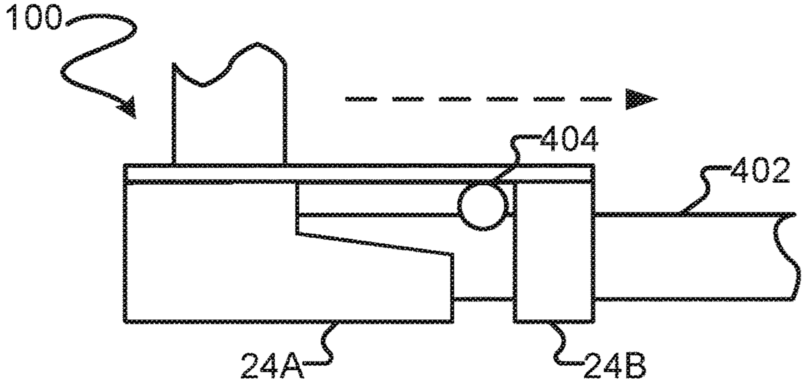
Figure 4C:
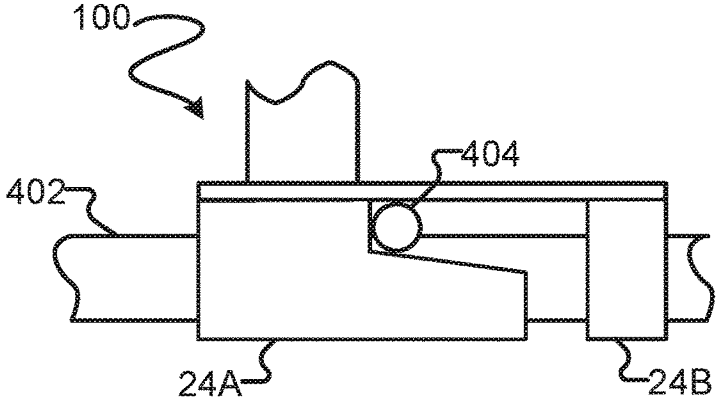

FIGS. 4A to 4C depicts doorstop 100 being mounted to bar grating 400. Bar grating 400 comprises bearing bar 402 and cross bar 404. Doorstop 100 is mounted to bar grating 400 by sliding mounting member 14 over cross bar 404. In some embodiments, doorstop 100 is mounted to bar grating 400 by receiving cross bar 404 through channels 28 and tapered slots 26.

FIG. 4A depicts channels 28 defined by mounting member 14 aligned with cross bar 404. Channels 28 are then slid over cross bar 404, thereby aligning cross bar 404 with tapered slots 26.

FIG. 4B depicts cross bar 404 aligned with tapered slots 26. Cross bar 404 is then slid through tapered slots 26 from the open ends of tapered slots 26 towards the closed ends of tapered slots 26. Tapered slots 26 secure cross bar 404, thereby mounting doorstop 100 to bar grating 400.

FIG. 4C depicts cross bar 404 secured within tapered slots 26.

To dismount doorstop 100 from bar grating 400, doorstop 100 is slid over cross bar 404 from the closed ends of tapered slots 26 towards the open ends of tapered slots 26 and into channels 28. Once cross bar 404 is slid into channels 28, doorstop 100 is removed from bar grating 400 by lifting doorstop 100 from bar grating 400, thereby removing cross bar 404 from channels 28.

Doorstop 100 may mounted to bearing bar 402 by:
- aligning channels 28 with bearing bar 402;
- sliding channels 28 over bearing bar 402, thereby aligning bearing bar 402 with tapered slots 26; and
- sliding doorstop 100 over bearing bar 402 from the open ends of tapered slots 26 towards the closed ends of tapered slot 26, thereby securing bearing bar 402 within slots 26 and mounting doorstop 100 to bearing bar 402.

Doorstop 100 may be dismounted from bearing bar 402 by sliding doorstop 100 over bearing bar 402 from the closed ends of tapered slots 26 towards the open ends of tapered slots 26 and into channels 28. Once bearing bar 402 is slid into channels 28, doorstop 100 is removed from bar grating 400 by lifting doorstop 100 from bar grating 400, thereby removing bearing bar 402 from channels 28.

Some Embodiments

In one or more embodiments of the present invention:
- one or more of body 10, handle 12, and mounting member 14 may comprise one or more of: aluminum, steel, plastic, and the like; and/or
- handle 12 may comprise rubber, for example a rubber sleeve with a rubber grip.

In one or more embodiments of the present invention, body 10 and handle 12 are formed from a single tube. In some embodiments, the tube is bent to form a first portion and a second portion of the tube on opposing sides of the bent section of the tube. In such embodiments, the first portion of the tube forms body 10, and the second portion of the tube forms handle 12.

Handle 12 may comprise a rubber sleeve covering a section of the tube. The rubber sleeve may form finger grips.

In one or more embodiments of the present invention:
- handle 12 is between two times and three times as long as body 10;
- handle 12 is at least three times as long as body 10; and/or
- handle 12 is mounted to body 10 at an angle to body 10, wherein the angle is between 130 degrees and 140 degrees.

In one or more embodiments of the present invention, mounting member 14 is formed from a single sheet of material, for example a single sheet of metal such as aluminum or steel. In such embodiments, receiving members 20 are formed from bent portions of the sheet of material, and slots 26 and channels 28 may be formed by removing portions of the sheet of material.

In one or more embodiments of the present invention:
- one or more of first channel width W1, second channel width W2, second height H2, and fourth height H4 are at least 5% greater than a thickness of a bar of a bar grating;
- one or both of first height H1 and second height H2 are substantially equal to a thickness of a bar of a bar grating;
- one or both of first height H1 and second height H2 are less than a thickness of a bar of a bar grating;
- one or both of first height H1 and second height H2 are at least 5% less than a thickness of a bar of a bar grating;
- second height H2 is greater than first height H1;
- second height H2 is at least 5% greater than first height H1;
- third height H3 is greater than fourth height H4; and/or
- third height H3 is at least 5% greater than fourth height H4.

As used in the present disclosure, substantially equal to may mean within 5%. For example, first height H1 being substantially equal to a thickness of a bar of a bar grating may mean first height H1 is +/−5% of the bar thickness. As another example, first angle $\theta 1$ being substantially perpendicular may mean first angle $\theta 1$ is between 85 degrees and 95 degrees.

In one or more embodiments of the present invention:
- body 10 is between 400 mm and 500 mm long;
- handle 12 is between 100 mm and 140 mm long;
- body 10 and handle 12 are formed from a tube, and the tube has a diameter between 15 mm and 25 mm;
- one or both of width W1 and width W2 are between 10 mm and 15 mm;

one or both of first height H1 and third height H3 are between 10 mm and 15 mm;

one or both of second height H2 and fourth height H4 are between 15 mm and 20 mm;

one or both of first slot 26A and second slot 26B are between 25 mm and 35 mm long; and/or one of both of first channel 28A and second channel 28B are between 25 mm and 35 mm long.

In some embodiments, doorstop 100 may comprise a means for securing doorstop 100 to a bar grating. For example, doorstop 100 may comprise a lock for securing doorstop 100 to the bar grating or means for receiving a lock to secure doorstop 100 to the bar grating.

Figure 5A:
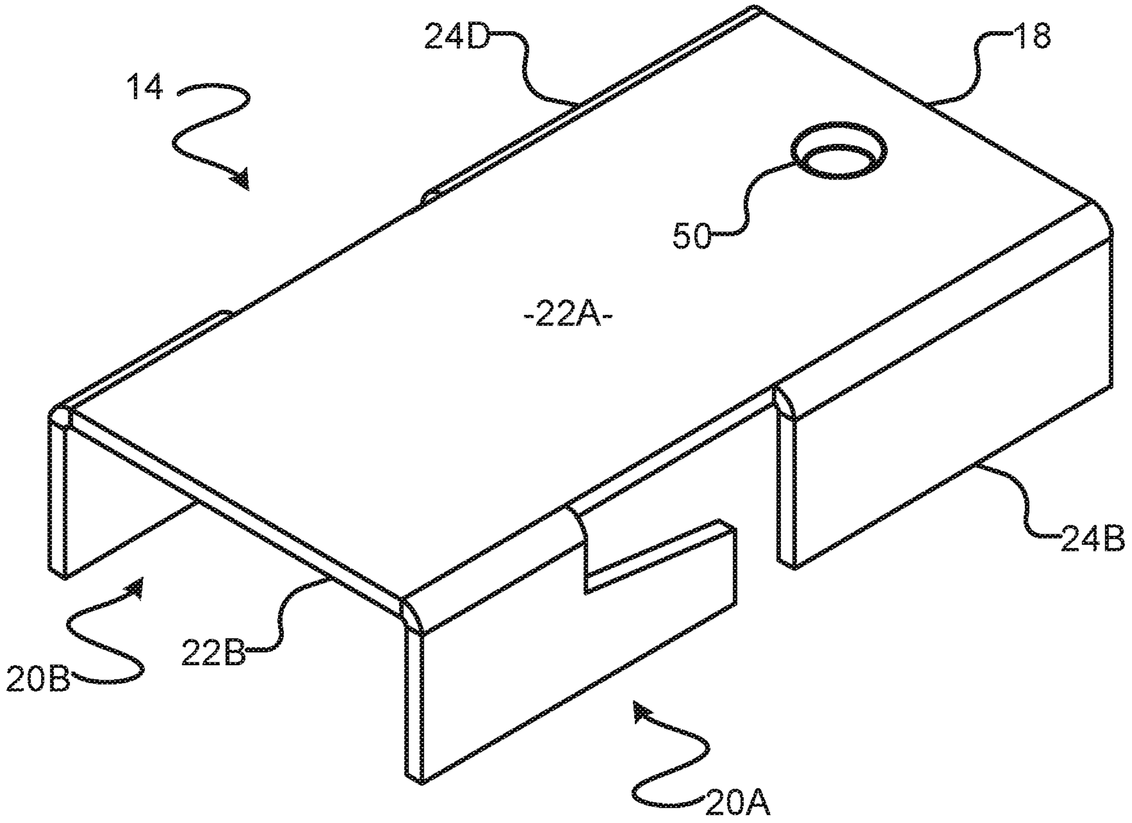
FIG. 5A is a perspective view of a doorstop mounting member according to another example embodiment of the present invention.

FIG. 5A is a perspective view of an embodiment of mounting member 14, wherein mounting member 14 defines aperture 50 through base 18. Aperture 50 is dimensioned to receive a locking means, for example a pad lock, for locking mounting member 14 to a bar grating. Mounting member 14, and thereby doorstop 100, may be locked to the bar grating by passing a locking means through aperture 50, around a bar of the bar grating, and locking the locking means.

In some embodiments, aperture 50 is defined by an area of base 18 between second projection 24B and fourth projection 24D. Aperture 50 may be formed along a center line of base 18, and thereby be equidistant between second projection 24B and fourth projection 24D.

Base 18 and aperture 50 may be dimensioned so aperture 50 aligns with a bar of a bar grating when doorstop 100 is mounted to the bar grating. Aperture 50 aligning with the bar of the bar grating my facilitate locking doorstop 100 to the bar grating, for example by minimizing a distance between aperture 50 and the bar.

Figure 5B:
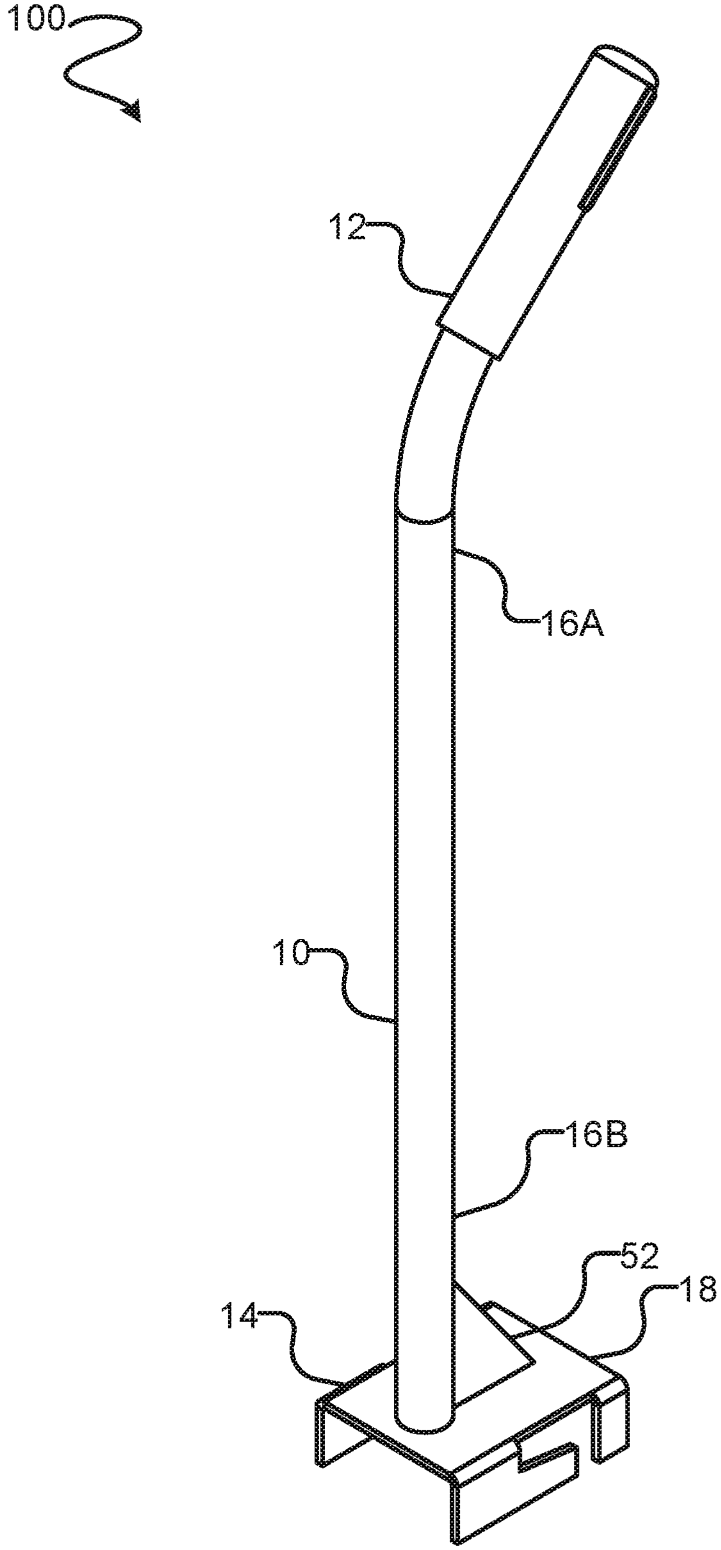
FIG. 5B is a perspective view of a doorstop according to another example embodiment of the present invention.

In some embodiments, doorstop 100 may comprise further structural members. For example, doorstop 100 may comprise one or more gussets or brackets between body 10 and base 18. FIG. 5B is a perspective view of an embodiment of doorstop 100, wherein doorstop 100 comprises gusset 52 between body 10 and base 18. Gusset 52 is secured to body 10 near second end 16B of body 10, and to base 18. Gusset 52 provides further attachment of body 10 to base 18.

Some embodiments of doorstop 100 may comprise further gussets of other structural members between body 10 and base 18.

Interpretation of Terms

Unless the context clearly requires otherwise, throughout the description and the "comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Where a component (e.g. a body, handle, slot, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. A doorstop mounted to bar grating comprising a first bar and a second perpendicular bar, the doorstop comprising:

a body having a first end and an opposing second end;

a handle attached to the first end of the body; and a mounting member comprising:

a base having a first side attached to the second end of the body and a second side opposing the first side; and a receiving member extending from the second side of the base and comprising a first projection and a second projection, wherein the first projection defines a tapered side of a slot holding the first bar of the bar grating and the second side of the base defines a level side of the slot, and the first projection and the second projection together define a channel adjoining the slot and perpendicular to the second side of the base;

wherein the body is attached to the first side of the base laterally spaced apart from where the first side opposes the second side of the base that defines the level side of the slot;

wherein the handle is attached to the body at a handle angle to the body, and the handle extends over the first side of the base where the first side of the base opposes the second side of the base that defines the level side of the slot;

wherein the second side of the base rests upon the second perpendicular bar of the bar grating; and wherein the first bar has a bar thickness, and a height of a closed end of the slot is equal to the bar thickness.

2. The doorstop of claim 1, wherein the body comprises one or both of a hollow tube and a solid rod.

3. The doorstop of claim 2, wherein the handle comprises one or both of a hollow tube and a solid rod continuous with the hollow tube or solid rod of the body.

4. The doorstop of claim 1, wherein the handle comprises a grooved rubber grip.

5. The doorstop of claim 1, wherein:

the body has a body length;

the handle has a handle length; and the body length is at least three times the handle length.

6. A doorstop mounted to bar grating comprising a first bar and a second perpendicular bar, the doorstop comprising:

a body having a first end and an opposing second end;

a handle attached to the first end of the body; and a mounting member comprising:

a base having a first side attached to the second end of the body and a second side opposing the first side; and a receiving member extending from the second side of the base and comprising a first projection and a second projection, wherein the first projection defines a tapered side of a slot holding the first bar of the bar grating and the second side of the base defines a level side of the slot, and the first projection and the second projection together define a channel adjoining the slot and perpendicular to the second side of the base;

wherein the body is attached to the first side of the base laterally spaced apart from where the first side opposes the second side of the base that defines the level side of the slot;

wherein the handle is attached to the body at a handle angle to the body, and the handle extends over the first side of the base where the first side of the base opposes the second side of the base that defines the level side of the slot;

wherein the second side of the base rests upon the second perpendicular bar of the bar grating; and wherein the handle extends from the body in a direction parallel to the second perpendicular bar of the bar grating.

* * * * *